(12) United States Patent
Kamo et al.

(10) Patent No.: US 12,405,597 B2
(45) Date of Patent: Sep. 2, 2025

(54) MACHINE TOOL

(71) Applicant: STAR MICRONICS CO., LTD., Shizuoka (JP)

(72) Inventors: Shotaro Kamo, Shizuoka (JP); Takeshi Ikegaya, Shizuoka (JP); Koichiro Shigama, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 634 days.

(21) Appl. No.: 17/883,888

(22) Filed: Aug. 9, 2022

(65) Prior Publication Data
US 2023/0060229 A1    Mar. 2, 2023

(30) Foreign Application Priority Data
Aug. 25, 2021  (JP) ................. 2021-137145

(51) Int. Cl.
*G05B 19/4155* (2006.01)
(52) U.S. Cl.
CPC ................. *G05B 19/4155* (2013.01)
(58) Field of Classification Search
None
See application file for complete search history.

(56) References Cited

U.S. PATENT DOCUMENTS

| | | | |
|---|---|---|---|
| 4,612,832 A | 9/1986 | Ushigoe et al. | |
| 2013/0340242 A1* | 12/2013 | Schuster | B23Q 7/045 82/122 |

FOREIGN PATENT DOCUMENTS

| | | |
|---|---|---|
| JP | S61161512 A | 7/1986 |
| JP | H05169349 A | 7/1993 |
| JP | H8-118201 | 5/1996 |
| JP | 2016218604 A | 12/2016 |

OTHER PUBLICATIONS

Notice of Reasons for Refusal for its corresponding Japanese application 2021-137145 (including English Machine-Translation).

* cited by examiner

*Primary Examiner* — Ryan A Jarrett
(74) *Attorney, Agent, or Firm* — MUNCY, GEISSLER, OLDS & LOWE, P.C.

(57) ABSTRACT

A controller of a machine tool determines in accordance with a machining program whether a first tool post is used to machine an unfinished workpiece. When the unfinished workpiece needs machining before terminating a continuous machining and when the controller determines that the first tool post is used to machine the unfinished workpiece W2, the controller simultaneously advances a first system and a second system in accordance with the machining program while preventing machining a workpiece held by the first spindle. When the controller determines that the first tool post is not used to machine the unfinished workpiece, the controller stops the first system and advances the second system in accordance with the machining program.

4 Claims, 8 Drawing Sheets

FIG. 4

Machining Program PR2

| System 1 | System 2 |
|---|---|
| (Cycle Stop Command) | (Cycle Stop Command) |
| ･･････････ | ･･････････ |
| T1xx ････････ | /T2xx1 Ux Sxxxx |
| ･･････････ | /G0 Zxx.x |
| ･･････････ | /G1 Wx.x Fx.xx |
| ･･････････ | /G0 Zxx.x |
| ･･････････ | ･･････････ |
| ･･････････ | (/Hold unfinished workpiece) |
| (Cut off workpiece) | ･･････････ |
| ･･････････ | ･･････････ |

FIG. 5

Machining Program PR2

| System 1 | System 2 |
|---|---|
| (Cycle Stop Command) | (Cycle Stop Command) |
| ........... | ........... |
| T3xx1 Ux | Mxx0 |
| G0 Yx.x | /T3xx1 |
| Mxx0 | /G0 Zxxx.x Uxx Sxxxx |
| Mxx1 | /G1 Wx.x Fx.xx |
| ........... | /G0 Zxxx.x |
| ........... | Mxx1 |
| ........... | ........... |
| ........... | (/Hold unfinished workpiece) |
| (Cut off workpiece) | ........... |
| ........... | ........... |

MACHINE TOOL

CROSS-REFERENCE TO RELATED APPLICATIONS

This application claims priority of Japanese Patent Application No. 2021-137145 filed on Aug. 25, 2021. The contents of this application are incorporated herein by reference in their entirety.

BACKGROUND OF THE INVENTION

The present invention relates to a machine tool provided with a plurality of headstocks capable of executing a continuous machining of a workpiece by simultaneously advancing a plurality of systems.

The machine tool includes a well-known NC (numerically control) lathe provided with a front headstock and back headstock. The NC lathe controls executing a front side machining that machines a front side of a workpiece held by a front spindle with a tool attached to a tool post, holding the workpiece with a back spindle, the workpiece being an unfinished workpiece whose front side has been machined, and executing a back side machining that machines a back side of the unfinished workpiece held by the back spindle with a tool attached to the tool post. During a continuous machining, the lathe controls a simultaneous progress of a first system for executing the front side machining and a second system for executing the back side machining in accordance with a machining program.

The NC lathe disclosed in Unexamined Patent Application Publications No. H08-118201 controls a simultaneous progress of a first front spindle system for driving a first front spindle and a second front spindle system for driving a second front spindle. A cycle start timing of the first front spindle system is different from that of the second front spindle system.

SUMMARY

The NC lathe conventionally controls a simultaneous progress of a first system for driving a front spindle and a second system for driving a back spindle to finish machining the workpiece before terminating the continuous machining. If the tool post included in the first system is not being used to machine the back side of the unfinished workpiece, the NC lathe only uses the second system to machine the back side of the unfinished workpiece held by the back spindle while suspending the first system to stop unintended machining the front side of the workpiece held by the front spindle. If the tool post included in the first system is being used to machine the back side of the unfinished workpiece, however, the NC lathe could not suspend the first system and could not stop unintended machining the front side of the workpiece held by the front spindle. That would require a special machining program for the special purpose. The operator would write two programs: a program allowing use of the tool post included in the first system and another program not allowing use of the tool post included in the first system.

The present invention discloses a machine tool eliminating the need for a special machining program to finish machining the workpiece before terminating the continuous machining whether a tool post of another system is used or not to machine the unfinished workpiece.

A machine tool of the invention may be capable of executing a continuous machining of a workpiece. The machine tool may include a first headstock provided with a first spindle capable of holding the workpiece; a second headstock provided with a second spindle capable of holding the workpiece passed from the first spindle, the workpiece passed from the first spindle being an unfinished workpiece whose front side has been machined; a first tool post on which a first tool is attached, the first tool being available to machine the workpiece held by at least one of the first spindle and the second spindle; a second tool post on which a second tool is attached, the second tool being available to machine the unfinished workpiece held by the second spindle; and a controller capable of simultaneously advancing a first system and a second system in accordance with a machining program, the first system controlling driving the first headstock incorporating the first spindle and the first tool post, the second system controlling driving the second headstock incorporating the second spindle and the second tool post. The controller may determine in accordance with the machining program whether the first tool post is used to machine the unfinished workpiece. When the unfinished workpiece needs machining before terminating the continuous machining and when the controller determines that the first tool post is used to machine the unfinished workpiece, the controller simultaneously advances the first system and the second system in accordance with the machining program while preventing machining the workpiece held by the first spindle. When the unfinished workpiece needs machining before terminating the continuous machining and when the controller determines that the first tool post is not used to machine the unfinished workpiece, the controller stops the first system and advances the second system in accordance with the machining program.

The invention can provide a machine tool eliminating the need for a special machining program to finish machining the workpiece before terminating the continuous machining whether a tool post of another system is used or not to machine the unfinished workpiece.

BRIEF DESCRIPTION OF THE DRAWINGS

FIG. 4 is an exemplary schematical machining program including a command not to use a first tool post to finish machining the workpiece.

FIG. 5 is an exemplary schematical machining program including a command to use a first tool post to finish machining the workpiece.

DETAILED DESCRIPTION

Figure 1:
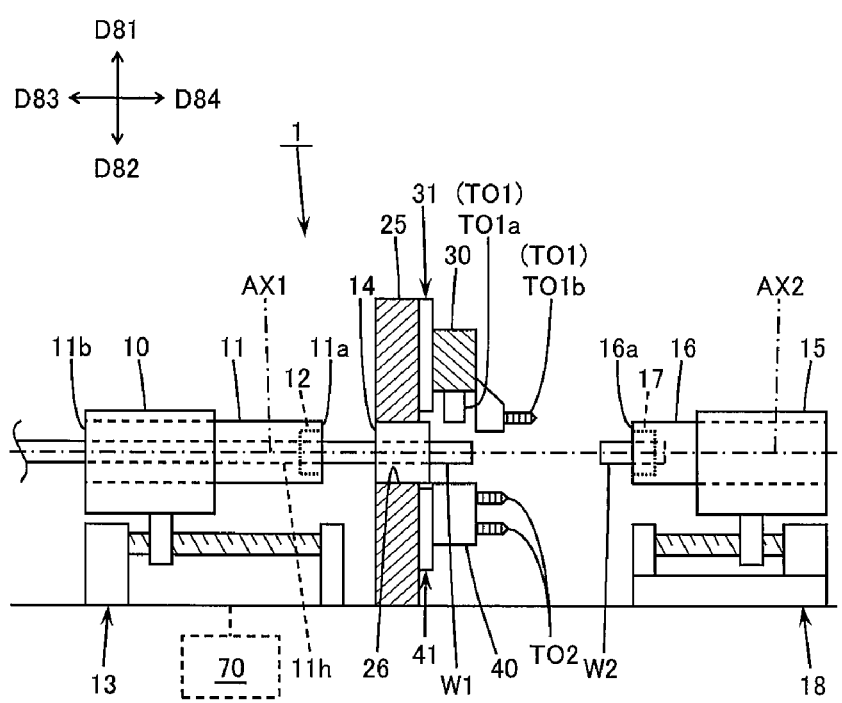
FIG. 1 is a front view schematically showing an exemplary configuration of a machine tool.

Hereinafter, an embodiment of the present invention will be described referring to the drawings. The invention is not limited to the exemplary embodiments. The features disclosed herein are not necessarily essential to the invention.

(1) Summary of Technology in Scope of the Invention

Technology of the invention is being described with reference to FIG. 1 to FIG. 8. The drawings only schematically show an example of the invention. They may have a mismatch to each other due to different magnification in each direction. Each element of the technology is not limited to the element denoted by a symbol in the embodiment.

Embodiment 1

Figure 2:
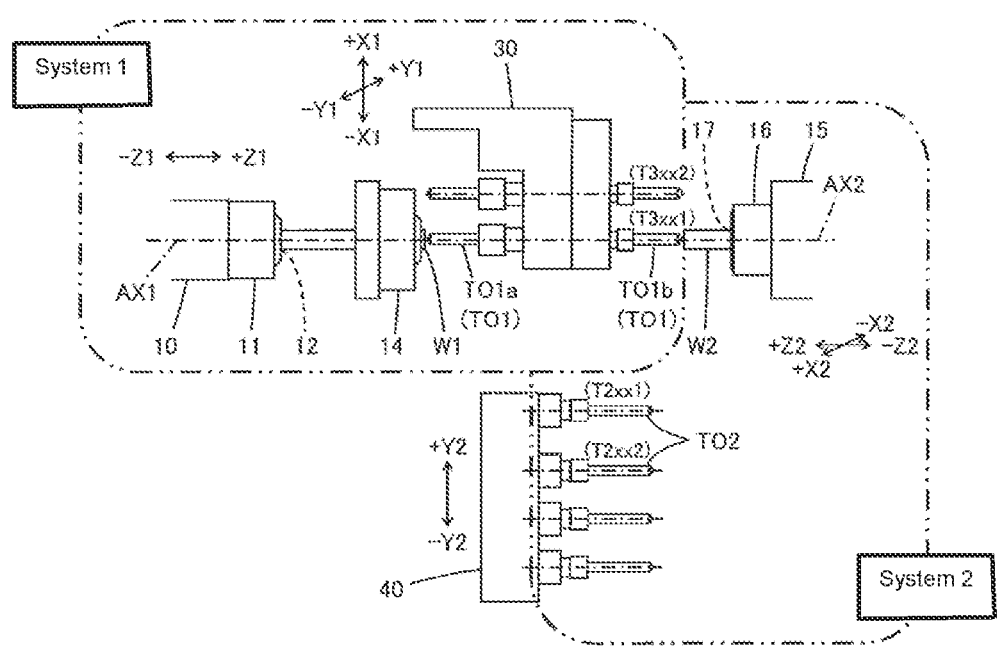
FIG. 2 is a schematical drawing of exemplary systems.
Figure 3:
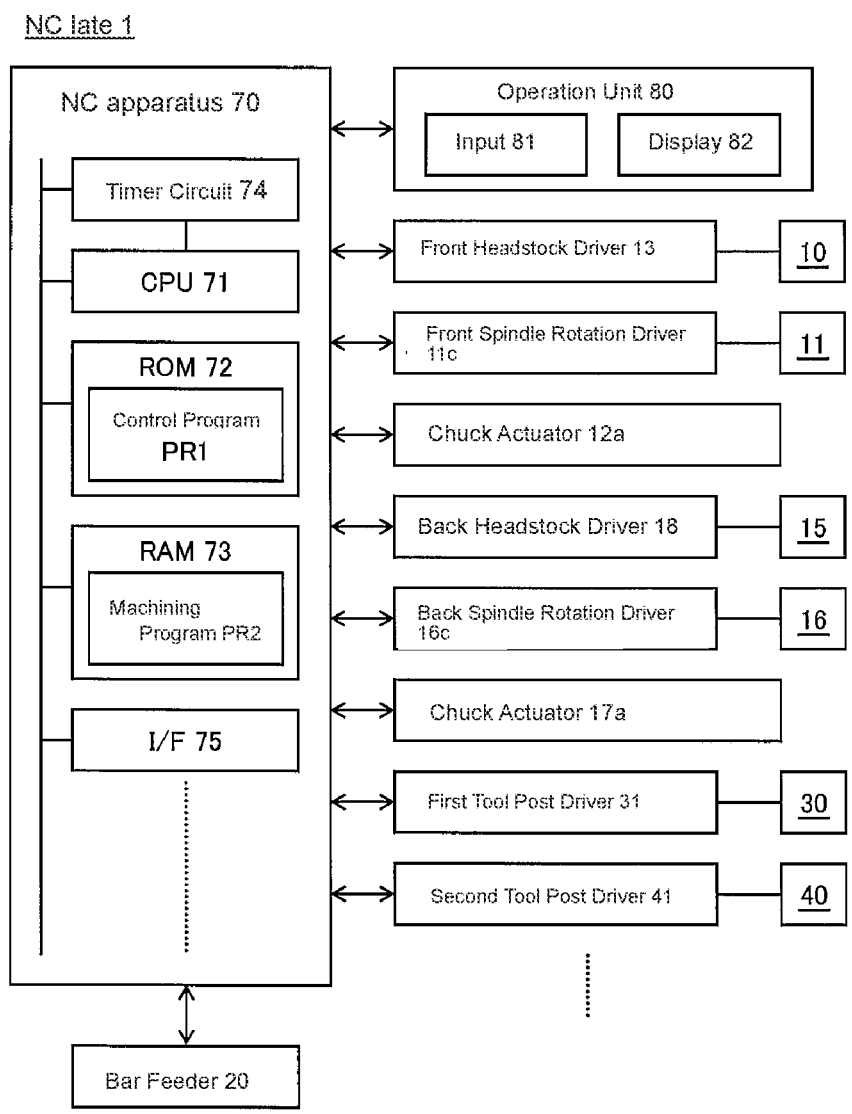
FIG. 3 is a block diagram schematically showing an exemplary configuration of an electrical circuit of the machine tool.

As shown in FIG. 1 to FIG. 3, a machine tool (for example, a lathe 1) of an embodiment of the invention may include the machine tool (1) capable of executing a continuous machining of a workpiece W1. The machine tool (1) may include a first headstock (for example, a front headstock 10), a second headstock (for example, a back headstock 15), a first tool post 30, a second tool post 40, and a controller (for example, an NC apparatus 70). The first headstock (10) may be provided with a first spindle (for example, a front spindle 11) capable of holding the workpiece W1. The second headstock (15) may be provided with a second spindle (for example, a back spindle 16) capable of holding the workpiece passed from the first spindle (11). The workpiece passed from the first spindle (11) may be an unfinished workpiece W2 whose front side has been machined. A first tool TO1 may be attached to the first tool post 30 to be available to machine the workpiece W1 held by at least one of the first spindle (11) and the second spindle (16). A second tool TO2 may be attached to the second tool post 40 to be available to machine the unfinished workpiece W2 held by the second spindle (16). The controller (70) may simultaneously advance a first system (for example, a system 1) and a second system (for example, a system 2) in accordance with a machining program PR2. The first system may control driving the first headstock (10) incorporating the first spindle (11) and the first tool post 30. The second system may control driving the second headstock (15) incorporating the second spindle (16) and the second tool post 40. The controller (70) may determine in accordance with the machining program PR2 whether the first tool post 30 is used to machine the unfinished workpiece W2. When the unfinished workpiece W2 needs machining before terminating the continuous machining and when the controller (70) determines that the first tool post 30 is used to machine the unfinished workpiece W2, the controller (70) may simultaneously advance the first system and the second system in accordance with the machining program PR2 while preventing machining the workpiece W1 held by the first spindle (11). When the unfinished workpiece W2 needs machining before terminating the continuous machining and when the controller (70) determines that the first tool post 30 is not used to machine the unfinished workpiece W2, the controller (70) may stop the first system and advance the second system in accordance with the machining program PR2.

The controller (70) may simultaneously advance a first system and a second system in accordance with the machining program PR2. The first system may control driving the first headstock (10) incorporating the first spindle (11) and the first tool post 30. The second system may control driving the second headstock (15) incorporating the second spindle (16) and the second tool post 40. The controller (70) may determine in accordance with the machining program PR2 whether the first tool post 30 is used to machine the unfinished workpiece W2.

When the unfinished workpiece W2 needs machining before terminating the continuous machining and when the controller (70) determines that the first tool post 30 is used to machine the unfinished workpiece W2, the controller (70) may simultaneously advance the first system and the second system in accordance with the machining program PR2 while preventing machining the workpiece W1 held by the first spindle (11). Accordingly, the machine tool (1) eliminates the need for a special machining program to finish machining the workpiece W2 before terminating the continuous machining. When the unfinished workpiece W2 needs machining before terminating the continuous machining and when the controller (70) determines that the first tool post 30 is not used to machine the unfinished workpiece W2, the controller (70) may stop the first system and advance the second system in accordance with the machining program PR1. Accordingly, the machine tool (1) eliminates the need for a special machining program to finish machining the workpiece W2 before terminating the continuous machining. Accordingly, the embodiment can provide a machine tool eliminating the need for a special machining program to finish machining the workpiece W2 before terminating the continuous machining whether a tool post of another system is used or not to machine the unfinished workpiece W2.

The second spindle may include an opposite spindle and a non-opposite spindle as far as it can pick up the unfinished workpiece passed from the first spindle. The systems are not limited to the first system and the second system. Three or more systems including the first system and the second system may be available. The words "first" and "second" only identify each of plural similar elements and does not mean any order of the plural similar elements. The remarks may apply to the following embodiments.

Embodiment 2

Figure 6:
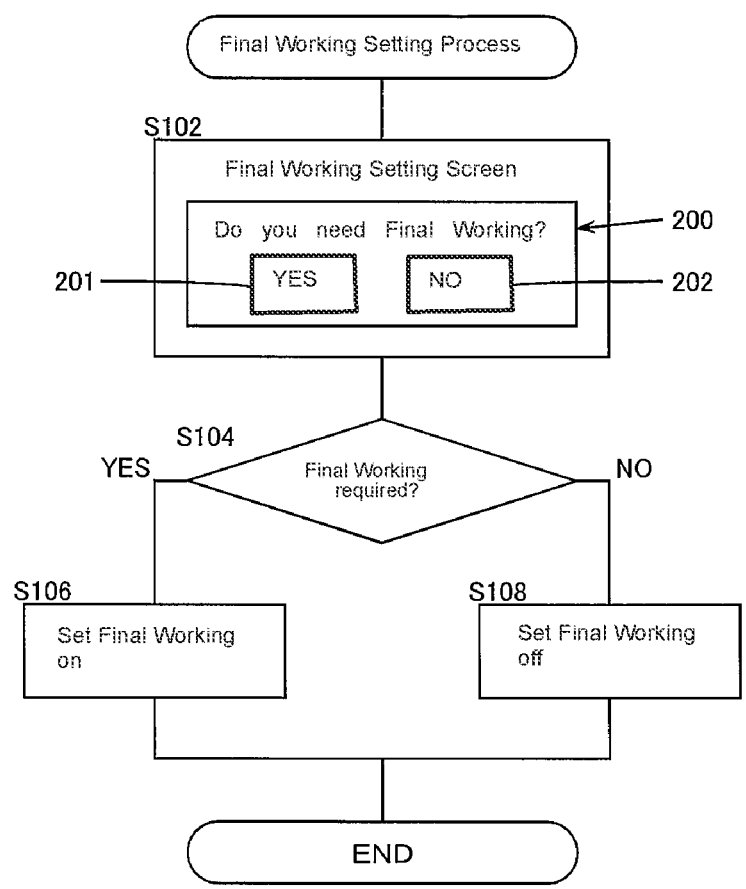
FIG. 6 is an exemplary schematical flow chart showing a final working setting process.

As shown in FIG. 6, the controller (70) may receive a setting representing whether the unfinished workpiece W2 needs machining before terminating the continuous machining. If the setting represents that the unfinished workpiece W2 needs no machining before terminating the continuous machining, the controller (70) may stop the first system and the second system without finishing machining the workpiece W2. The embodiment allows the operator to select whether the unfinished workpiece W2 needs machining before terminating the continuous machining, which improves convenience.

Embodiment 3

Figure 8:
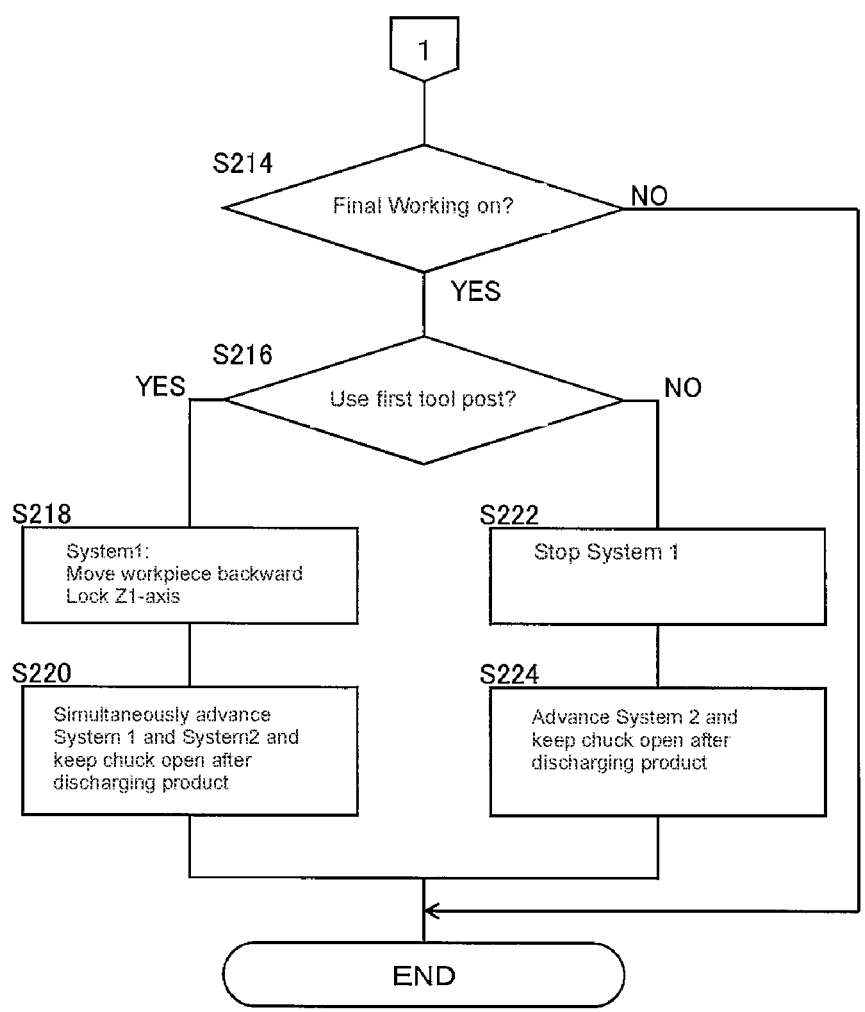
FIG. 8 is an exemplary flow chart showing a machining process.

As shown in FIG. 8, Then the controller (70) receives a setting representing that the unfinished workpiece W2 needs machining before terminating the continuous machining and the controller (70) determines that the first tool post 30 is used to machine the unfinished workpiece W2, the controller (70) may drive the first headstock (10) incorporating the first spindle (11) to a backward position preventing interference of the first tool TO1 with the workpiece W1 and stop driving the first headstock (10), and then drive the first tool post in the first system 1. The controller (70) may drive at least the second headstock (15) incorporating the second spindle (16) holding the unfinished workpiece W2 in the second system. The embodiment prohibits interference of the first tool TO1 with the workpiece W1 held by the first spindle (11) when the first tool post 30 is used to machine the unfinished workpiece W2 before terminating the continuous machining. The embodiment provides a suitable example of finishing machining the workpiece W2 before terminating the continuous machining when the first tool post 30 is being used to machine the unfinished workpiece W2.

(2) Exemplary Configuration of the Lathe

FIG. 1 is a front view schematically showing an exemplary configuration of the lathe 1. FIG. 2 is a schematical drawing of exemplary systems. In FIG. 1, a symbol D81 denotes an upper direction, a symbol D82 denotes a lower direction, a symbol D83 denotes a left direction, a symbol D84 denotes a right direction, all of which may be the directions viewing the lathe 1 in FIG. 1.

The lathe 1 may include an NC lathe including the front headstock 10, a front headstock driver 13, the back headstock 15, a back headstock driver 18, a supporting bed 25, the first tool post 30, a first tool post driver 31, the second tool post 40, a second tool post driver 41, and the NC (numerical control) apparatus 70. The front headstock 10 may be an example of the first headstock provided with the front spindle 11 representing the first spindle. The back headstock 15 may be an example of the second headstock provided with the back spindle 16 representing the second spindle. The NC apparatus 70 may be an example of the controller. The lathe 1 may include another tool post such as a third tool post in addition to the first tool post 30 and the second tool post 40. The lathe 1 may include another spindle such as a third spindle in addition to the first spindle and the second spindle.

The front headstock 10 may incorporate the front spindle 11. The front spindle 11 may releasably hold the bar workpiece W1 that a bar feeder 20 (FIG. 3) may insert from the back. A front end 11a of the front spindle 11 may face the back spindle 16 while a back end 11b thereof may face the bar feeder 20. The front spindle 11 may have a through-hole 11h extended along a spindle axis AX1. The workpiece W1 may be inserted into the through-hole 11a from the back. The back headstock 15 may incorporate the back spindle 16. The back spindle 16 as an example of the opposite spindle may releasably hold the unfinished workpiece W2 protruded from the front end 11a of the front spindle 11. A front end 16a of the back spindle 16 may face the front end 11a of the front spindle 11. The front spindle 11 and the back spindle 16 may face each other. A forward direction of the front spindle 11 may be a direction that the workpiece W1 is pushed out from the front spindle 11, which is the right direction D84 in FIG. 1. A backward direction of the front spindle 11 may be a direction toward the bar feeder 20, which is the left direction D83 in FIG. 1. A forward direction of the back spindle 16 may be a direction toward the front spindle 11, which is the left direction D83 in FIG. 1. The supporting bed 25 may have a mounting hole 26 where a guide bush 14 may be attached as shown in FIG. 1 or the front end of the front spindle 11 may be inserted (not shown). The lathe 1 may include a lathe of spindle sliding type removably provided with the guide bush 14.

The front spindle 11 may include a chuck 12 releasably tightening the workpiece W1. The front spindle 11 holding the workpiece W1 may be rotatable on the spindle axis AX1. The NC apparatus 70 may control the chuck 12 by driving a chuck actuator 12a as shown in FIG. 3. The chuck 12 may include a collet. The front headstock driver 13 may drive the front headstock 10 in a +Z1-axis direction and a −Z1-axis direction (FIG. 2) under control of the NC apparatus 70. The +Z1-axis direction and the −Z1-axis direction may be directions along the Z1-axis representing a control axis. The +Z1-axis direction may be the right direction D84 in FIG. 1. The −Z1-axis direction may be the left direction D83 in FIG. 1.

The back spindle 16 may include a chuck 17. The chuck 17 may releasably tighten the unfinished workpiece W2. The back spindle 16 holding the workpiece W2 may be rotatable on a spindle axis AX2. The workpiece W2 may contain the front side of the workpiece W1 supplied from the bar feeder 20. The workpiece W2 may be separated from the workpiece W1 with a not-shown cut-off tool after completion of the front side machining that machines the front side of the workpiece W1 held by the front spindle 11. The NC apparatus 70 may control the chuck 17 by driving a chuck actuator 17a as shown in FIG. 3, The chuck 17 may include a collet. The back headstock driver 18 may drive the back headstock 15 in a +Z2-axis direction, a −Z2-axis direction a +X2-axis direction and a −X2-axis direction (FIG. 2) under control of the NC apparatus 70. The +Z2-axis direction and the −Z2-axis direction may be directions along the Z2-axis representing a control axis. The +Z2-axis direction may be the left direction D83 in FIG. 1. The −Z2-axis direction may be the right direction D84 in FIG. 1. The +X2-axis direction and the −X2-axis direction may be opposite directions along the X2-axis representing a control axis. The Z2-axis and the X2-axis may be perpendicular to each other or may only cross each other. The workpiece W2 separated from the workpiece W1 may be discharged as a product after finishing the back side machining that machines the back side of the unfinished workpiece W2.

The workpiece W1 may be a long solid columnar material or a long hollow cylindrical material.

The supporting bed 25 may be located between the front headstock 10 and the back headstock 15 respect to the Z1-axis direction. The supporting bed 25 may have the mounting hole 26 penetrated in the Z1-axis direction. The guide bush 14 may be inserted in the mounting hole 26 to be removably attached to the supporting bed 25 as shown in FIG. 1. The guide bush 14 may slidably support the workpiece W1 protruded forward from the through-hole 11h of the front spindle 11. The workpiece W1 supported by the guide bush 14 may slide in the Z-axis direction. A portion of the workpiece W1 protruded from the guide bush 14 toward the back spindle 16 (in the right direction D84) may be machined with the first tool TO1. In the lathe from which the guide bush 14 is removed, the front end of the front spindle 11 may be inserted in the mounting hole 26. A portion of the workpiece W1 protruded forward (in the right direction D84) from the front spindle 11 may be machined with the first tool TO1.

The plural tools TO1 for use to machine the workpiece W1 held by at least one of the front spindle 11 and the back spindle 16 may be attached to the first tool post 30. The tool post driver 31 may drive the first tool post 30 in an +X1-axis direction, a −X2-axis direction, a +Y1-axis direction and a −Y1-axis direction (FIG. 2) under control of the NC apparatus 70. The +X1-axis direction and the −X1-axis direction may be directions along the X1-axis representing a control axis. The +X1-axis direction may be the upper direction D81 in FIG. 1. The −X1-axis direction may be the lower direction D82 in FIG. 1. The +Y1-axis direction and the −Y1-axis direction may be opposite directions along the Y1-axis representing a control axis. The X1-axis and the Y1-axis may be perpendicular to each other or may only cross each other. The +Y1-axis direction may coincide with the −X2-axis direction and the −Y1-axis direction may coincide with the +X2-axis direction as shown in FIG. 2. Instead, the −X1-axis direction may coincide with the −X2-axis direction and the +X1-axis direction may coincide with the +X2-axis direction. The first tool post 30 may include a gang tool post and a turret tool post.

The plural tools TO1 may include a turning tool such as the cut-off tool and a tool such as a drill and an endmill. The plural tools TO1 may include a front machining tool TO1a for use to machine the workpiece W1 held by the front spindle and a back machining tool TO1b for use to machine the unfinished workpiece W2 held by the back spindle 16. The front machining tool TO1a may include the cut-off tool. Instead the back machining tool TO1b may include the cut-off tool.

Plural tools TO2 for use to machine the unfinished workpiece W2 held by the back spindle 16 may be attached to the second tool post 40. The second tool post driver 41 may drive the second tool post 40 in a +Y2-axis direction and a −Y2-axis direction (FIG. 2) under control of the NC apparatus 70. The +Y2-axis direction and the −Y2-axis direction may be opposite directions along the Y2-axis representing a control axis. The +Y1-axis direction may be the upper direction D81 in FIG. 1. The −Y1-axis direction may be the lower direction D82 in FIG. 1. The plural tools TO2 may include a drill and a tap.

The drawings only schematically show an example of the invention. They may have a mismatch to each other due to different magnification in each direction. Each element of the technology is not limited to the element denoted by a symbol in the embodiment.

As shown in FIG. 2, the NC apparatus 70 may control a simultaneous progress of the system 1 for driving the front headstock 10 incorporating the front spindle 11 and the first tool post 30 and the system 2 for driving the back headstock 15 incorporating the back spindle 16 and the second tool post 40. The system 1 may be an example of the first system. The system 2 may be an example of the second system. The back working tool TO1b attached to the front tool post 30 may belong to the system 1. The back working tool TO1b may be used to machine the back side of the unfinished workpiece W2, which requires the NC apparatus 70 to control a simultaneous progress of the system 1 and the system 2.

FIG. 3 is a block diagram schematically showing an exemplary configuration of an electrical circuit of the lathe 1 provided with the NC apparatus 70. The NC apparatus 70 may connect to an operation unit 80, the bar feeder 20, the front headstock driver 13, a front spindle rotation driver 11c, the chuck actuator 12a, the back headstock driver 18, a back spindle rotation driver 16c, the chuck actuator 17a, the first tool post driver 31, and the second tool post driver 41. The front spindle rotation driver 11c may include a not shown servo motor (a built-in motor, for example) to rotate the front spindle 11 around the spindle axis AX1. The chuck actuator 12a may drive the chuck 12 of the front spindle 11. The back spindle rotation driver 16c may include a not shown servo motor (a built-in motor, for example) to rotate the back spindle 16 around the spindle axis AX2. The chuck actuator 17a may drive the chuck 17 of the back spindle 16. The NC apparatus 70 may include a CPU (Central Processing Unit) 71, a ROM (Read Only Memory) 72 or a semiconductor memory, a RAM (Random Access Memory) 73 or a semiconductor memory, a timer circuit 74, and an I/F (Interface) 75. In FIG. 3, the IF 75 may collectively represent plural interfaces of the operation unit 80, the bar feeder 20, the front headstock driver 13, the front spindle rotation driver 11c, the chuck actuator 12a, the back headstock driver 18, the back spindle rotation driver 16c, the chuck actuator 17a, the first tool post driver 31, and the second tool post driver 41. The ROM 72 may store a control program PR1 for interpreting and executing a machining program PR2. The ROM 72 may be a rewritable semiconductor memory. The RAM 73 may rewritably store the machining program PR2 written by an operator. The machining program may be also called an NC program. The CPU 71 may use the RAM 73 as a work area to execute the control program PR1 stored in the ROM 72 to enable the NC apparatus 70 to operate accordingly.

The operation unit 80 may include an input 81 and a display 82 to serve as a user interface for the NC apparatus 70. The input 81 may include a button and a touch panel accessible by the operator. The display 82 may include a monitor that displays various information relating to the lathe 1 including the settings given by the operator. The operator can store the machining program PR2 in the RAM 73 by using the operation unit 80 and an external computer (not shown).

The front headstock driver 13 may be provided with a servo amplifier connected to the NC apparatus 70, a servo motor connected to the servo amplifier, a feed mechanism, and a guide to move the front headstock 10 and the front spindle 11 thereon in the Z1-axis direction. The front headstock driver 13 may control a position of the front headstock 10 with respect to the Z1-axis direction under control of the NC apparatus 70. The front spindle rotation driver 11c may control a rotation position of the front spindle 11 in accordance with an instruction from the NC apparatus 70. The back headstock driver 18 may be provided with a servo amplifier connected to the NC apparatus 70, a servo motor connected to the servo amplifier, a feed mechanism, and a guide to move the back headstock 15 and the back spindle 16 thereon in the Z2-axis direction. The back headstock driver 18 may control a position of the hack headstock 15 with respect to the Z2-axis direction under control of the NC apparatus 70. The back spindle rotation driver 16c may control a rotation position of the back spindle 16 in accordance with an instruction from the NC apparatus 70.

The first tool post driver 31 may be provided with a servo amplifier connected to the NC apparatus 70, a servo motor connected to the servo amplifier, a feed mechanism, and a guide to move the first tool post 30 in the X1-axis and Y1-axis directions. The first tool post driver 31 may control a position of the first tool post 30 with respect to the X1-axis and Y1-axis directions under control of the NC apparatus 70. The second tool post driver 41 may be provided with a servo amplifier connected to the NC apparatus 70, a servo motor connected to the servo amplifier, a feed mechanism, and a guide to move the second tool post 40 in the Y2-axis directions. The second tool post driver 41 may control a position of the second tool post 40 with respect to the Y2-axis direction under control of the NC apparatus 70.

The NC apparatus 70 may first control machining the front side of the workpiece W1 held by the front spindle 11 in the system 1 (FIG. 2). The NC apparatus 70 may then control machining the back side of the unfinished workpiece W2 held by the back spindle 16 in the system 2 (FIG. 2). The NC apparatus 70 may synchronize the system 1 and the system 2 to enable cutting off the workpiece W1 held by both the front spindle 11 and the back spindle 16 with the cut-off tool. The NC apparatus 70 may also synchronize the system 1 and the system 2 to control machining the back side of the unfinished workpiece W2 with the back working tool TO1b (FIG. 2). How the NC apparatus 70 controls machining the workpiece W1 is being described.

In the system 1, the NC apparatus 70 may control having the front spindle 11 hold the workpiece W1 whose end is protruded forward from the guide bush 14. The NC apparatus 70 may control driving the front headstock 10 (incorporating the front spindle 11) and the first tool post 30 to allow machining the front side of the workpiece W1 with the front working tool TO1a. Then in the system 2, the NC apparatus 70 may control driving the back headstock 15 (incorporating the back spindle 16) to have the back spindle 16 hold the workpiece W1 passed from the front spindle 11. The workpiece W1 passed from the from spindle 11 may be the unfinished workpiece W2 whose from side has been machined. The NC apparatus 70 may control synchronizing the systems 1 and 2 to allow culling off the workpiece W1.

In the systems 1 and 2, the NC apparatus 70 may control synchronously rotating the front spindle 11 and the back spindle 16. In the system 1, the NC apparatus 70 may control driving the first tool post 30 to allow separation of the unfinished workpiece W2 from the workpiece W1 with the cut-off tool. Upon completion of separation, the NC apparatus 70 control machining the back side of the unfinished workpiece W2 held by the back spindle 16.

If the back working tool TO1b on the first tool post 30 is not used, in the system 2, the NC apparatus 70 may control driving the back headstock 15 (incorporating the back spindle 16) and the second tool post 40 to allow machining the back side of the unfinished workpiece W2 with the second tool TO2. Upon completion of machining, the NC apparatus 70 may control driving the back headstock 15 (incorporating the back spindle 16) to allow discharging a product. During the time machining and discharging is being executed in the system 2, the NC apparatus 70 may control machining the front side of a next workpiece W1 in the system 1. Cutting off the workpiece W1 could decide the position of the end of the workpiece W1 protruded from the guide bush 14. The NC apparatus 70 may control driving the front headstock 10 (incorporating the front spindle 11) and the first tool post 30 to allow machining the next workpiece W1 with the front working tool TO1a in the system 1.

If the back working tool TO1b included in the system 1 is being used, the NC apparatus 70 may control the progress of the systems 1 and 2 to allow machining the back side of the unfinished workpiece W2 at least with the back working tool TO1b attached to the first tool post 30. The NC apparatus 70 may control driving at least the first tool post 30 in the system 1 and at least the back headstock 15 incorporating the back spindle 16 in the system 2. If the second tool TO2 included in the system 2 is also being used, the NC apparatus 70 may control driving the hack headstock 15 incorporating the back spindle 16 and the second tool post 40 in the system 2 to allow machining the hack side of the unfinished workpiece W2 with the second tool TO2 attached to the second tool post 40. Upon completion of machining, the NC apparatus 70 may control driving the back headstock 15 to allow discharging a product. If the back working tool TO1b is not used, the NC apparatus may control machining the front side of a next workpiece W1 in the system 1. The NC apparatus 70 may control driving the front headstock 10 incorporating the front spindle 11 and the first tool post 30 in the system 1 to allow machining the front side of the next workpiece W1 with the front working tool TO1a.

As described above, the NC apparatus 70 may control the simultaneous progress of the system 1 and the system 2. The operator may separately write the machining program PR2 for the systems 1 and 2 each. In the lathe capable of simultaneously overlapping the system 1 and the system 2 in accordance with the machining program PR2, the systems 1 and 2 may possibly stop in response to cycle stop commands at the beginning of the machining program PR2 each during the continuous machining. That would cause a suspension of the machine just after the back spindle 16 picks up the unfinished workpiece W2. The machine could be getting cold as time passes, which could cause thermal displacement or contraction of a metal part. When the continuous machining resumes, such workpiece could be discarded as a defective product having dimensions error. It would be therefore desired at the cycle stop timing to have the NC apparatus 70 prohibit machining the front side of the workpiece W1 that the front spindle 11 holds and allow machining the back side of the unfinished workpiece W2 that the back spindle 16 holds only.

The NC apparatus 70 could use a special machining program to prohibit machining the front side of the workpiece W1 at the cycle stop timing and allow machining the back side of the workpiece W2 only. Writing such special machining programs would, however, take time.

If the system 1 for the front spindle is not being used for the back side machining, the NC apparatus 70 could simply proceed the system 2 while stopping the system 1. That could allow machining the back side of the unfinished workpiece W2 held by the back spindle 16 while prohibiting machining the front side of the workpiece W1 held by the front spindle 11. If the back working tool TO1b included in the system 1 is being used for the back side machining, however, the system 1 may necessarily proceed to finish machining the workpiece W2. Continued progress of the system 1, however, would allow unintended machining the front side of the workpiece W1 held by the front spindle 11. It would take time to prepare the machining programs PR2 separately for either case allowing use and non-use of the back working tool TO1b to machine the unfinished workpiece W2.

In this embodiment, the NC apparatus 70 may automatically determine whether the first tool post 30 is used to machine the unfinished workpiece W2 in accordance with the machining program PR2. That eliminates the need for special machining programs adapted to either case allowing use and non-use of the first tool post 30 to machine the unfinished workpiece W2.

An exemplary machining program PR2 is being described referring to FIG. 4 and FIG. 5. The symbol "x" in the drawings represents a number from 0 to 9. FIG. 4 is art exemplary schematical machining program PR2 not using the first tool post 30 to machine the back side of the unfinished workpiece W2. The machining programs for the systems 1 and 2 each may start from the cycle stop command to suspend the machining program upon satisfaction of cycle stop requirements.

In the system 2 program, the cycle stop command may be followed by a command string to machine the back side of the workpiece W2 with the second tool TO2 attached to the second tool post 40. The word T2001 to T2999 may represent one of the second tools TO2. The word "T2xx1" may index the corresponding second tool TO2. The word "Ux" may represent a depth of machining. The word "Sxxxx" may represent the number of rotations per unit time (rpm, for example) of the back spindle 16. The symbol "/" may represent a block skip function for skipping a subsequent block when the back spindle 16 does not hold the workpiece. The block "G0 Zxx.x" may represent a command to move the back spindle 16 to the word "Zxx.x" position with respect to the Z2-axis. The block "G1 Wx.x Fx.xx" may represent a command to move the back spindle 16 by a distance represented by the word "Wx.x" at a speed represented by the word "Fx.xx". Upon completion of back side machining, the back spindle 16 may return to the original position with respect to the Z2-axis in accordance with the block "G0 Zxx.x". The command strings for the back side machining may be followed by a pick-up command to chuck the next unfinished workpiece W2 by the back spindle 16.

The system 1 program may include command strings to machine the front side of the next workpiece W1 during the time the second tool TO2 is used to machine the back side of the workpiece W2. The word T101 to T999 may represent one of the front working tools TO1a. The word "T1xx" may index the corresponding front working tool TO1a. The command strings for the front side machining may be followed by a cut-off command to cut off the workpiece W1 with the cut-off tool immediately after the back spindle holds the workpiece W2 in the system 2.

FIG. 5 is an exemplary schematical machining program PR2 using the first tool post 30 to machine the back side of the unfinished workpiece W2. In the system 1 program, the cycle stop command may be followed by a not shown command string to execute machining the front side of the workpiece W1. The command string to execute the front side machining may be followed by a command string to use the back working tool TO1b attached to the first tool post 30. The word T3001 to T3999 may represent one of the back working tools TO1b. The word "T3xx1" may index the corresponding back working tool TO1b. The word "Ux" may represent a depth of machining. The block "G0 Yx.x" may represent a command to move the first tool post 30 to the word "Yx.x" position with respect to the Y1-axis. The block "Mxx0" may be a wait command to match the progress of the system 2 with the progress of the system 1. Upon reading the block "Mxx0" of the system 1, the NC apparatus may proceed the system 2 in accordance with a command following the block "Mxx0" in the system 2.

In the system 2 program in FIG. 5, the cycle stop command may be followed by a command string to machine the back side of the unfinished workpiece W2 in cooperation with the system 1. The word "T3xx1" may match the corresponding back working tool TO1b to a coordinate system of the back spindle 16. The word "T3xx1" in the system 2 is not the command to index the corresponding back working tool TO1b, which requires a description of the word "T3xx1" in the system 1. The block "G0 Zxxx.x Uxx Sxxx" may represent a command to move the back spindle 16 to the word "Zxxx.x" position with respect to the Z2-axis. The word "Uxx" may represent a depth of machining. The word "Sxxxx" may represent the number of rotations per unit time (rpm, for example) of the back spindle 16. The block "G1 Wx.x Fx.xx" may represent a command to move the back spindle 16 by a distance represented by the word "Wx.x" at a speed represented by the word "Fx.xx". Upon completion of back side machining, the back spindle 16 may return to the original position with respect to the Z2-axis in accordance with the block "G0 Zxx.x". The block "Mxx1" may be a wait command to match the progress of the system 1 with the progress of the system 2. Upon reading the block "Mxx1" of the system 2, the NC apparatus may proceed system 1 in accordance with a command following the block "Mxx1" in the system 1. The command strings to execute the back side machining may be followed by a pick-up command to pick up the next unfinished workpiece W2 by the back spindle 16.

The system 1 program may include the cut-off command to cut off the workpiece W1 with the cut-off tool after the word "Mxx1" in the system 1 and immediately after the command to chuck the workpiece W2 by the back spindle 16 in the system 2.

Some users want to have the unfinished workpiece W2 still unfinished when the continuous machining ends. The embodiment may allow the operator to select whether the unfinished workpiece W2 needs machining before terminating the continuous machining.

(3) Exemplary Final Working Setting Process

FIG. 6 may be an exemplary flow chart schematically showing a final working setting process to receive a setting whether the operator needs a final working when the continuous machining ends. Upon the input 81 receiving a request for a final working setting screen 200, the NC apparatus 70 may control displaying the final working setting screen 200 on the display 82 (Step S102). The final working setting screen 200 may have a display area showing the dialog "Do you need final working?" and an input area including a "YES" button 201 and a "NO" button 202. The "final working" may mean executing the back side machining that machines the back side of the unfinished workpiece W2 before terminating the continuous machining.

The NC apparatus 70 may receive "YES" (201) or "NO" (202) at the input 81. The process may proceed to a step S104 where the process may have branches according to the "YES" or "NO" inputs.

Upon receiving the "YES" input, the NC apparatus 70 may set the final working on (S106) and then end the final working setting process. Specifically, the NC apparatus 70 may store the final working setting in the RAM 73 or the ROM 72. The RAM 73 or the ROM 72 may prestore a final working setting flag. The NC apparatus 70 may turn the flag on to represent that the operator needs finishing machining the workpiece W2 before the continuous machining ends. Otherwise, the NC apparatus 70 may input the final working setting in a latching relay in a programmable logic controller.

Upon receiving the "NO" input, the NC apparatus 70 may set the final working off (S108) and then end the final working setting process. Specifically, the NC apparatus 70 may store the final working setting in the RAM 73 or the ROM 72. The RAM 73 or the ROM 72 may prestore the final working setting flag. The NC apparatus 70 may turn the flag off to represent that the operator need not finishing machining the workpiece W2 before the continuous machining ends. Otherwise, the NC apparatus 70 may input the final working setting in the latching relay in the programmable logic controller. Furthermore, the NC apparatus 70 may receive the final working setting with a mechanical switch.

(4) Exemplary Machining Process

Figure 7:
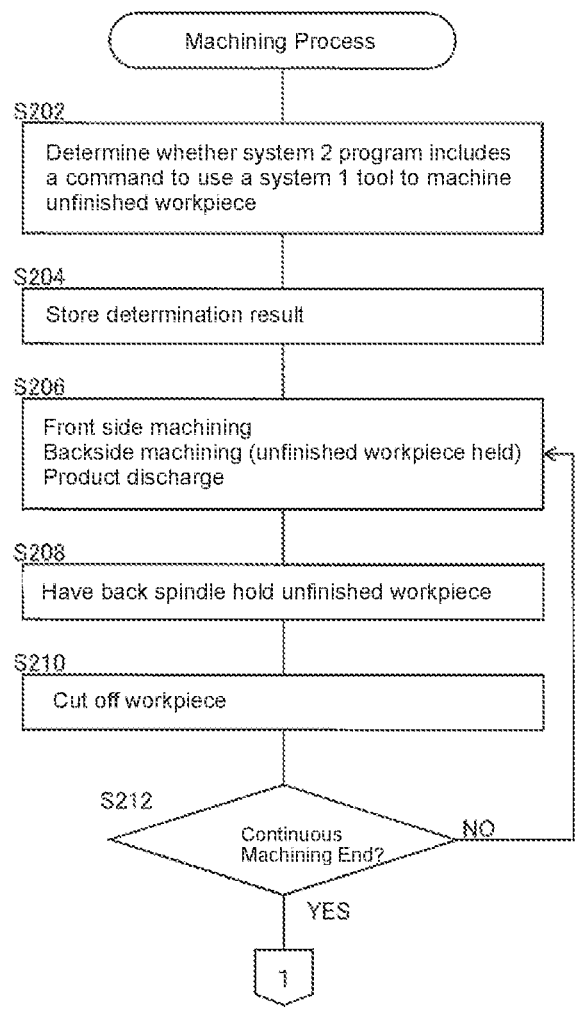
FIG. 7 is an exemplary flow chart showing a machining process.

FIG. 7 and FIG. 8 show exemplary flow charts each showing a machining process to be executed in accordance with the machining program PR2 under control of the NC apparatus 70 executing the control program PR1.

Upon starting the machining process, the NC apparatus 70 may first determine whether the system 2 program includes a command to use the system 1 back working tool TO1b to machine the unfinished workpiece W2 (a step S202). For example, if the system 2 program includes the word T3001 to T3999 as shown in FIG. 5, the NC apparatus may determine that the system 2 program include a command to use the back working tool TO1b to machine the back side the unfinished workpiece W2. If the system 2 program includes no word T3001 to T3999, the NC apparatus may determine that the system 2 program include no command to use the back working tool TO1b to machine the back side the unfinished workpiece W2. As described above, the NC apparatus 70 may determine whether the first tool post 30 is used to machine the unfinished workpiece W2 in accordance with the machining program PR2.

The NC apparatus 70 may store the determination result in the RAM 73 or the ROM 72 (a step S204). The NC apparatus 70 may then control executing the front side machining that machines the front side of the workpiece W1 in the system 1 in accordance with the machining program PR2. The NC apparatus 70 may control executing the back side machining that machines the back side of the unfinished workpiece W2 in at least one of the systems 1 and 2 while the back spindle 16 holds the workpiece W2. The NC apparatus 70 may then control discharging a product in the system 2 (S206). As shown in FIG. 4 and FIG. 5, each command in the system 2 program except the wait command may have the "/" symbol representing the skip function, which skips a subsequent block while the back spindle 16 does not hold the workpiece. Accordingly, the NC apparatus 70 may control the back side machining and the product discharge in accordance with the commands in the system 2 only while the back spindle 16 holds the unfinished workpiece W2. The commands in the system 2 may be skipped while the back spindle 16 does not hold the workpiece W2.

Upon completion of front side machining, the NC apparatus 70 may control synchronizing the systems 1 and 2 and driving the back headstock 15 to enable the back spindle 16 to hold the workpiece W2 held by the front spindle 11 in response to a pick-up command in the system 2 (S208). The pick-up command in the system 2 may have the "/" symbol representing the skip function. Accordingly, the pick-up command may be executed while the back spindle 16 holds the workpiece W2 and ignored while the back spindle 16 does not hold the workpiece W2. This eliminates a useless operation in the system 2 while there exists no workpiece whose back side needs machining. The NC apparatus 70 may control synchronizing rotation of the front spindle 11 and the back spindle 16 in the systems 1 and 2 and driving the first tool post 30 to enable the cut-off tool to cut off the workpiece W1 (S210). The front spindle 11 may hold a fresh workpiece W1 while the back spindle 16 may hold the unfinished workpiece W2.

Upon completion of cut-off operation in S208 to S210, the NC apparatus, in a step S212, may advance the process to S214 (FIG. 8) to end the continuous machining or may repeat S206 to S212 to continue the continuous machining. For example, the process may proceed to S214 upon at least one of the cases: (1) The NC apparatus 70 receives a bar-out signal from the bar feeder. (2) The front side machining of the workpiece W1 has reached the preset number of products. (3) The operator manually stops the continuous machining. The NC apparatus 70 may otherwise determine continuing the continuous machining and return the process to S206.

In FIG. 8, the step S214 may proceed to S216 if the final working has been set on. The process may end if the final working has been set off. The NC apparatus 70 may advance the process to S216 according to such flag value stored in the RAM 73 or the ROM 72 as representing that the final working is set on. The NC apparatus 70 may end the process according to such flag value stored in the RAM 73 or the ROM 72 as representing that the final working is set off. The NC apparatus 70 may end the continuous machining process by stopping the systems 1 and 2 with the unfinished workpiece W2 remaining unfinished according to the setting representing that no final working is required for the unfinished workpiece W2.

The step S216 may have branches depending on the determination result stored in the RAM 73 or the ROM 72 (S204) determining whether the first tool post 30 is being used to machine the unfinished workpiece W2. The NC apparatus 70 may advance the process to S218 if the determination result represents the use of the system 1. The NC apparatus 70 may advance the process to S222 if the determination result represents the non-use of the system 1.

If the first tool post 30 is being used to machine the unfinished workpiece W2, the NC apparatus 70 may have the front spindle 11 hold the workpiece W1, move the front headstock 10 backwards in the Z1-axis direction to a position preventing interference of the first tool TO1 with the workpiece W1, and then lock the Z1-axis (S218). The front spindle 11 holding the workpiece W1 may move in the −Z1 direction within a range that the workpiece W1 does not come off the guide bush 14 to prevent entry of lubricant into the space on the front spindle 11 side. Locking the Z1-axis would prohibit movement of the front headstock 10 in the Z1-axis direction. The front headstock 10 could not move regardless of the coordinates of the front headstock 10 defined in the machining program PR2. Movement of the first tool post 30 in the X1-axis and the Y1-axis may be still allowed. The step S218 prevents interference of the first tool TO1 attached to the first tool post 30 with the workpiece W1 held by the front spindle 11.

Upon locking the Z1-axis, the NC apparatus 70 may launch simultaneous progress of the systems 1 and 2 to enable the back side machining of the unfinished workpiece W2 at least with the back working tool TO1b. The NC apparatus 70 may then advance the system 2 to discharge a product and thereafter keep the chuck 17 of the back spindle 16 open (S220). In accordance with the machining program PR2 enabling machining the back side of the unfinished workpiece W2 as shown in FIG. 5, the system 1 may control movement of the back working tool TO1b with the blocks including the tool indexing command. The system 2 may control driving the back headstock 15 with the blocks including the command for the number of rotations and the position of the back spindle 16. Accordingly, the NC apparatus 70 may allow the back side machining by driving the first tool post 30 in the system 1 to move the back working tool TO1b while driving the back headstock 15 incorporating the back spindle 16 in the system 2. If the second tool TO2 attached to the second tool post 40 is also being used, the NC apparatus 70 may drive the second tool post 40 to move the second tool 102 and drive the back headstock 15 in the system 2. In the system 2 program, the pick-up command after a discharge of a product may have the symbol "/" representing the skip function. The pick-up command may be disabled after a discharge of a product since the chuck 17 of the back spindle 16 is kept open. When continuous machining of the workpiece W1 ends, the NC apparatus 70 may prohibit the back spindle 16 from receiving a next unfinished workpiece W2 from the front spindle 11 in the system 2. The system 2 can exclude a waste operation and enable effective performance of back side machining and product discharge.

The machining cycle may stop in response to the cycle stop command upon returning the top of the machining program PR2 (FIG. 5). The machining process as shown in FIG. 7 and FIG. 8 may then end. The NC apparatus 70 may simultaneously advance the systems 1 and 2 in accordance with the machining program PR2 while prohibiting machining the workpiece W1 held by the front spindle 11. The NC apparatus 70 may thereby enable the back side machining of the workpiece W2 to be finished by use of the first tool post 30 before terminating the continuous machining without using a special machining program.

If the first tool post 30 is not being used to finish the workpiece W2, the NC apparatus 70 may stop the system 1 (S222). The NC apparatus 70 may then advance the system 2 to machine the back side of the unfinished workpiece W2 with the second tool TO2 attached to the second tool post 40. The NC apparatus 70 may then discharge a product and thereafter keep the chuck 17 of the back spindle 16 open (S224). In accordance with the machining program PR2 enabling machining the back side of the unfinished workpiece W2 as shown in FIG. 4, the system 2 may control movement of the second tool 102 with the blocks including the tool indexing command. The system 2 may control driving the back headstock 15 with the blocks including the command for the number of rotations and the position of the back spindle 16. Accordingly, the NC apparatus 70 may allow the back side machining by driving the second tool post 40 to move the second tool TO2 while driving the back headstock 15 incorporating the back spindle 16 in the system 2. In the system 2 program, the pick-up command after a discharge of a product may have the symbol "/" representing the skip function. The pick-up command may be disabled after a discharge of a product since the chuck 17 of the back spindle 16 is kept open. The NC apparatus 70 may prohibit the back spindle 16 from receiving a next unfinished workpiece W2 from the front spindle 11 in the system 2 when the continuous machining of the workpiece W1 ends. The system 2 can exclude a waste operation and enable effective performance of back side machining and product discharge.

The machining cycle may stop in response to the cycle stop command upon returning the top of the machining program PR2 (FIG. 4). The machining process as shown in FIG. 7 and FIG. 8 may then end. The NC apparatus 70 may thereby enable the back side machining of the workpiece W2 to be finished by non-use of the first tool post 30 before terminating the continuous machining without using a special machining program.

As described above, the lathe 1 eliminates the need for a special machining program to finish machining of the workpiece W2 before terminating continuous machining whether a tool post of another system is used or not to machine the back side of the unfinished workpiece W2.

(5) Modified Embodiments

The invention may be embodied in various modifications. For example, the machine tool where the technology applies may include a machining center and others.

(6) Conclusion

As described above, the invention may provide a technology eliminating the need for a special machining program to finish machining of the workpiece before terminating continuous machining whether a tool post of another system is used or not to machine the back side of the unfinished workpiece. The fundamental functions and effects are available even in a technology only comprising elements of independent claims. The elements described in the embodiments may be replaced to each other and any combination of the elements may be changed in the scope of the invention. Any prior art may be replaced with the element described in the embodiments and any combination of the prior art and the element may be changed in the scope of the invention.

What is claimed is:
1. A machine tool capable of executing a continuous machining of a workpiece comprising:
  a first headstock provided with a first spindle capable of holding the workpiece;
  a second headstock provided with a second spindle capable of holding the workpiece passed from the first spindle, the workpiece passed from the first spindle being an unfinished workpiece whose front side has been machined;
  a first tool post on which a first tool is attached, the first tool being available to machine the workpiece held by at least one of the first spindle and the second spindle;
  a second tool post on which a second tool is attached, the second tool being available to machine the unfinished workpiece held by the second spindle; and
  a controller capable of simultaneously advancing a first system and a second system in accordance with a machining program, the first system controlling driving the first headstock incorporating the first spindle and the first tool post, the second system controlling driving the second headstock incorporating the second spindle and the second tool post;
  wherein the controller determines in accordance with the machining program whether the first tool post is used to machine the unfinished workpiece,
  when the unfinished workpiece needs machining before terminating the continuous machining and when the controller determines that the first tool post is used to machine the unfinished workpiece, the controller simultaneously advances the first system and the second system in accordance with the machining program while preventing machining the workpiece held by the first spindle, and
  when the unfinished workpiece needs machining before terminating the continuous machining and when the controller determines that the first tool post is not used to machine the unfinished workpiece, the controller stops the first system and advances the second system in accordance with the machining program.

2. The machine tool of claim 1, wherein the controller receives a setting representing whether the unfinished workpiece needs machining before terminating the continuous machining, and if the setting represents that the unfinished workpiece needs no machining before terminating the continuous machining, the controller stops the first system and the second system without finishing machining the unfinished workpiece.

3. The machine tool of claim 2, wherein when the controller receives a setting representing that the unfinished workpiece needs machining before terminating the continuous machining and determines that the first tool post is used to machine the unfinished workpiece, the controller drives the first headstock incorporating the first spindle to a backward position preventing interference of the first tool with the workpiece held by the first spindle and stops driving the first headstock, and then drives the first tool post in the first system, and the controller drives at least the second headstock incorporating the second spindle holding the unfinished workpiece in the second system.

4. The machine tool of claim 1, wherein when the controller receives a setting representing that the unfinished workpiece needs machining before terminating the continuous machining and determines that the first tool post is used to machine the unfinished workpiece, the controller drives the first headstock incorporating the first spindle to a backward position preventing interference of the first tool with the workpiece held by the first spindle and stops driving the first headstock, and then drives the first tool post in the first system, and the controller drives at least the second headstock incorporating the second spindle holding the unfinished workpiece in the second system.

* * * * *